United States Patent
Grewing et al.

(10) Patent No.: US 12,306,321 B2
(45) Date of Patent: May 20, 2025

(54) METHOD AND SYSTEM FOR DETERMINING THE POSITION OF AT LEAST ONE OBJECT

(71) Applicant: Forschungszentrum Jülich GmbH, Jülich (DE)

(72) Inventors: Christian Grewing, Jülich (DE); Christian Roth, Düsseldorf (DE); -Ing. Markus Robens, Aachen (DE); Alessandra Lai, Aachen (DE)

(73) Assignee: Forschungszentrum Jülich GmbH (DE)

( * ) Notice: Subject to any disclaimer, the term of this patent is extended or adjusted under 35 U.S.C. 154(b) by 364 days.

(21) Appl. No.: 17/908,807

(22) PCT Filed: Jan. 12, 2021

(86) PCT No.: PCT/EP2021/050446
§ 371 (c)(1),
(2) Date: Sep. 1, 2022

(87) PCT Pub. No.: WO2021/175502
PCT Pub. Date: Sep. 10, 2021

(65) Prior Publication Data
US 2023/0101932 A1    Mar. 30, 2023

(30) Foreign Application Priority Data
Mar. 2, 2020 (DE) .......... 102020202642.4

(51) Int. Cl.
*G01S 5/02* (2010.01)

(52) U.S. Cl.
CPC .......... *G01S 5/0246* (2020.05); *G01S 5/0221* (2013.01); *G01S 5/0226* (2013.01); *G01S 5/0295* (2020.05)

(58) Field of Classification Search
CPC .... G01S 5/0246; G01S 5/0295; G01S 5/0221; G01S 5/0226
See application file for complete search history.

(56) References Cited

U.S. PATENT DOCUMENTS

| | | |
|---|---|---|
| 6,154,173 A | 11/2000 | Lennen et al. |
| 10,025,960 B1 * | 7/2018 | Fink .......... H04L 5/08 |

(Continued)

FOREIGN PATENT DOCUMENTS

| | | | |
|---|---|---|---|
| DE | 69828957 T2 | 3/2006 | |
| DE | 102016012101 A1 * | 4/2018 | ......... G01S 1/042 |

(Continued)

OTHER PUBLICATIONS

International Search Report with English Translation and Written Opinion for PCT Application No. PCT/EP2021/050446, dated Mar. 30, 2021, 11 pages.

(Continued)

*Primary Examiner* — Vladimir Magloire
*Assistant Examiner* — Nazra Nur Waheed
(74) *Attorney, Agent, or Firm* — Dickinson Wright PLLC

(57) ABSTRACT

The invention relates to a method and a system for position determination of at least one object, in particular inside a building. In a method for position determination of at least one object, at least four transmitters transmit circularly polarized signals and a receiver to be localized receives the circularly polarized signals. At least two and in particular all transmitters transmit periodic signals of different frequencies, these frequencies being closely adjacent.

20 Claims, 2 Drawing Sheets

(56) References Cited

U.S. PATENT DOCUMENTS

Figure 1:
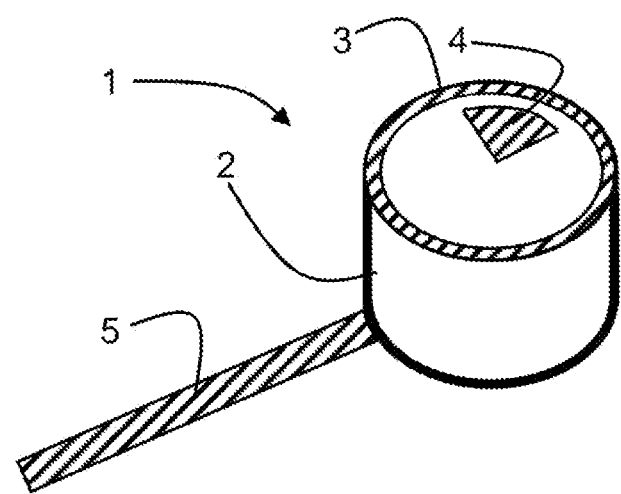

2018/0054006 A1* 2/2018 Wang ................ H01Q 21/24
2019/0187237 A1 6/2019 Yao et al.

FOREIGN PATENT DOCUMENTS

EP 2405281 A1 1/2012
WO 2006015290 A2 2/2006

OTHER PUBLICATIONS

International Telecommunications Union, "Propagation data and prediction methods for the planning of indoor radiocommunication systems and radio local area networks in the frequency range 900 MHz to 100 GHz," Rec. ITU-R P.1238-5, pp. 1-18.

* cited by examiner

METHOD AND SYSTEM FOR DETERMINING THE POSITION OF AT LEAST ONE OBJECT

CROSS-REFERENCE TO RELATED APPLICATION(S)

This present application is a national stage application of International Patent Application No. PCT/EP2021/050446, filed Jan. 12, 2021, which claims priority to German Patent Application No. 102020202642.4, filed Mar. 2, 2020, the disclosures of which are hereby incorporated by reference in their entireties.

The invention relates to a method and a system for position determination of at least one object, in particular inside a building.

A large number of methods are known for the position determination of objects, a great part of which are based on the transmission and reception of electromagnetic waves by radio. These are often suitable for determining the position of objects or persons outdoors. For example, methods are known which determine a distance between transmitter and receiver on the basis of a signal's propagation time or propagation time difference and thus enable a position determination when using several transmitters and/or receivers.

In the position determination inside a building, on the other hand, interfering signals occur to a much greater extent, which make the described procedures more difficult or impossible. Signals are multiplied, attenuated and delayed by reflection from surfaces and interaction with objects. Instead of a single signal transmitted along the direct line of sight between transmitter and receiver, a multitude of overlapping signal components are now received, the interpretation of which is difficult or impossible. This is called multipath influence or multichannel propagation. For example, it is known from the publication "Recommendation ITU-R P.1238-5; Propagation data and prediction methods for the planning of indoor radiocommunication systems and radio local area networks in the frequency range 900 MHz to 100 GHz, 02/2007" that signals reflecting indoors can interfere with wireless communications. These additional signals act like additional noise in the system. Due to its similarity to the desired received signal, i.e. the signal transmitted on the direct path, it cannot be filtered out.

Code division multiplexing is commonly used in conventional positioning systems. This method enables the simultaneous transmission of different user data streams on a common frequency range and uses so-called spreading codes for frequency spreading and for distinguishing the different data streams. In other words, the data is separated from each other using different codes that are orthogonal to each other. Frequency spreading widens the frequency spectrum used, which on the one hand increases differences in propagation times caused, for example, by filters and antenna components. On the other hand, the wideband receiver has increased power consumption.

DE 10 2016 012 101 A1 and U.S. Pat. No. 2,019,018 72 37 A1 describe a method for position determination of an object equipped with a mobile station and using at least four reference objects with base stations. This can be used for position determination inside buildings, but does not have satisfactory precision under all conditions.

It is an object of the invention to provide a further developed method and system for position determination of at least one object.

The task is solved by the method for position determination of at least one object according to claim 1 as well as by the system for position determination of at least one object according to the additional claim. Embodiments result from the subclaims.

A method for position determination of at least one object, in particular inside a building, serves to solve the task, in which at least four transmitters transmit circularly polarized signals and a receiver to be localized receives the circularly polarized signals. At least two and in particular all transmitters transmit periodic signals of different frequencies, these frequencies being closely adjacent (closely spaced) to each other. The method according to the invention allows a particularly precise position determination.

A signal comprises an electromagnetic wave. The signal may be an electromagnetic wave and/or a radio signal, i.e. a character or a corresponding character sequence transmitted by electromagnetic waves. In the latter case, the character or character sequence to be transmitted is modulated onto an electromagnetic wave serving as a carrier signal. The electromagnetic wave is in particular of high frequency. In particular, the signals are periodic signals that are transmitted continuously or in time periods. A periodic signal is a signal that has a pattern that repeats at regular time intervals, i.e., a periodic pattern. This has the advantage that the transmitted signals have discrete Fourier spectra with narrow, clearly formed maxima. In particular, all transmitters transmit periodic signals. A transmitter is also referred to as a measurement point. The position of the measuring point is typically known. In particular, it is part of a defined positioning system. At least four transmitters are required for an exact position determination.

Circularly polarized signals are signals with a circularly polarized electric field component. In particular, circularly polarized electromagnetic waves are meant, i.e. electromagnetic waves with a circularly polarized electric field component. In circularly polarized signals, in contrast to linear polarization, the directions of the magnetic and electric field components change continuously over time as well as in space. The field strength vector rotates clockwise or counterclockwise perpendicular to the direction of propagation. Circularly polarized signals can be transmitted and/or received by circularly polarized antennas, such as helical antennas. A device with two linearly polarized antennas offset by 90° and fed with a phase shift of 90° can also transmit and/or receive circularly polarized signals. the amplitudes of the two linear components of the transmitted signals are then essentially equal, since elliptical polarization would otherwise result. Circularly polarized antennas are not broadband and thus are suitable for the narrowband method using different, closely adjacent frequencies. The polarization rotation direction at the transmitter and receiver is typically the same, since otherwise considerable attenuation of the signal would occur.

The receiver is also referred to as the measurement object. The position of the receiver is not known and is to be determined by means of the method according to the invention. For this purpose, propagation times or propagation time differences of the individual signals are usually used.

The receiver receives the circularly polarized signals. However, in the case of multipath influence, especially inside a building, it does not receive them unchanged, but in multiplied, attenuated and/or delayed form. The received signal thus has a shifted phase, propagation time, and/or altered amplitude compared to a signal transmitted via the direct path. Thus, instead of a single signal, a multitude of overlapping signal components is received from each individual transmitter.

The receiver receives periodic signals of different frequencies that have been transmitted by the individual transmitters. The receiver receives the signals so that they can be evaluated and the position of the receiver can be determined based on the evaluated signals. In particular, the receiver evaluates the signals. In particular, the receiver determines its position based on the evaluated signals.

An object in the sense of the invention means an item, a human being, an animal or a part thereof. Position determination means the determination of information about the position of an object, in particular the determination of the position of the object with respect to a defined fixed point and/or a defined positioning system. It is irrelevant whether the actual process of position determination takes place at the location of the object, at the location of a fixed point or elsewhere. In particular, the method is configured for determination of the position of an object located inside a building. In this case, the receiver to be localized is located inside the building. In particular, at least one transmitter and typically all transmitters are also located inside the building.

Closely adjacent frequencies allow short measurement distances and a comparatively small spectrum. Thus, differences in propagation time behavior, for example due to filters and antenna components, are minimal and the power consumption of the receiver is also low due to the small bandwidth. The short measurement distances and the same propagation times enable a high-resolution and thus precise position determination.

Noise, interfering signals and reflections of the signal on surfaces influence the signal during channel propagation between transmitter and receiver. Influences caused by reflections are particularly critical. These have the same frequencies as the direct signal and therefore cannot be filtered out. The receiver can then not select the correct signals from a large number of received signals and the position determination is inaccurate, faulty or impossible.

When a circularly polarized signal is reflected from a surface, in addition to the attenuation of the signal and possibly a change of the signal towards an elliptical polarization, typically, depending on the nature and material of the surface, the direction of rotation is reversed. In other words, a phase rotation of 180 degrees occurs. This effect is independent of frequency. Thus, the significant attenuation described above due to the different polarization rotation directions of the transmitter and receiver can be used to disregard or suppress reflected signals and in this way to minimize multipath influence. In particular, the receiver is configured to disregard such attenuated signals. For this purpose, it can, for example, be designed in such a way that it only takes into account signals of which the amplitude is above a certain threshold value. In the event of renewed reflection of the already reflected signal, for example on an opposite wall, the original direction of rotation is restored by renewed reversal of the direction of rotation. However, the attenuation of the signal due to the multiple reflection is so high that this signal component does not cause a significant interference. Circular polarization thus makes it possible to suppress the reflected signal components due to the reversal of the direction of rotation.

When using different, closely adjacent frequencies, distortions occur that show up in a dent, also called a "ditch", in the amplitude at the beginning of a change in amplitude. In other words, the entire rise of a square wave signal, for example, does not show up immediately. Thus, the time of arrival (ToA) of the signal cannot be determined exactly. This is due to the fact that the attenuated and/or delayed signal components are superimposed on the reception of the direct signal, wherein the duration of the delay is irrelevant. It has been shown that, surprisingly, this phenomenon can be prevented by using circularly polarized signals. In this way, precision can be increased even further.

With the method according to the invention it is possible to determine the position of objects inside a building or rooms with high accuracy. This also applies to densely built-up areas and underground, where conventional methods cannot achieve a position determination or can achieve it only with low precision due to the multipath influence. The position determinations can be performed with a very high measuring rate.

No code division multiplexing, usually abbreviated as CDMA, is necessary because different frequencies are used. This means that several measurement points can be used simultaneously without channel subdivision or frequency spreading, as is the case with CDMA. This simplifies the method and enables more precise position determinations.

In one embodiment, a first group of transmitters transmit signals of closely adjacent, different frequencies and a second group of transmitters transmit signals of closely adjacent, different frequencies, wherein the frequencies of the first group and the frequencies of the second group are widely spaced. In one embodiment, at least two transmitters transmit signals whose frequencies are widely spaced. Signals that are widely spaced have a frequency difference that is greater than the bandwidth of the signals used. In this way, different transmitters can be easily distinguished from each other.

In one configuration, the closely adjacent frequencies are less than one bandwidth of the transmitted signals apart. The closely adjacent frequencies are less than a bandwidth of at least one transmitted signal and, in particular, all transmitted signals apart. Thus, the phase of the signals can be more easily used for refinement of the position determination and the available frequency range is efficiently utilized.

In one embodiment, the signals are transmitted in the 5.8 GHz frequency band. Signals are transmitted in four different frequencies. These have a spacing of 100 kHz each. The frequencies can also be referred to as carrier frequencies onto which signals to be transmitted are modulated.

In one configuration, the closely adjacent frequencies are less than the reciprocal period of the transmitted signals apart. The closely adjacent frequencies are less than the reciprocal period of at least one transmitted signal and in particular of all transmitted signals apart. In other words, the modulation frequency is a multiple of the spacing of the channel frequencies. Particularly closely adjacent frequencies allow particularly short measurement distances and a particularly small spectrum, so that the differences in the propagation time behavior as well as the power consumption are particularly small and a particularly precise position determination is possible.

In particular, the closely adjacent frequencies behave according to the following formula:

$$|f_n - f_m| \mod \Delta f \neq 0.$$

Here, $f_n$ is the frequency of a transmitter of any base station, $f_m$ is the frequency of a transmitter of any other base station, and $\Delta f$ is the frequency spacing between the maxima in the Fourier spectrum of the signals used. In particular, the periods of the signals or of the periodic patterns of the signals are chosen such that the frequency spacing $\Delta f$ is the same for the transmitters of the closely adjacent frequencies.

Advantageously, signals with the same periodic pattern are chosen for transmitting signals that are transmitted on closely adjacent frequencies, so that the comparison of signals from different transmitters becomes easier.

In one configuration, the closely adjacent frequencies are less than one quarter, in particular one eighth, of the reciprocal period of the transmitted signals apart. They may be exactly one eighth or less than one eighth of the reciprocal period of the transmitted signals apart. Such a closely adjacent range of the different frequencies allows a particularly precise position determination.

In one configuration, at least two and in particular all transmitters transmit signals in the frequency range between 3 GHz and 9 GHz, preferably between 4 GHz and 8 GHz, in particular between 4.5 GHz and 7.5 GHz and for example between 5.5 GHz and 6.5 GHz.

These frequencies allow particularly small receivers that can be attached to objects and/or easily carried by persons whose position is to be determined. In addition, they allow precise position determination. In one embodiment, the transmitters transmit in the 5.8 GHz range.

In one configuration, at least two and in particular all transmitters transmit the signals at mutually defined time intervals. For example, the transmitted signals can be pulsed with defined timing, wherein the pulse duration and the spacing of the pulses can be freely selected.

In a further configuration, at least two and in particular all transmitters transmit the signals simultaneously at least in time periods. They may also transmit the signals at fixed time intervals, which may be partly simultaneous.

By transmitting and, if necessary, receiving the signals simultaneously, an even more precise position determination can be made, since the evaluated signals of all transmitters are available simultaneously at any time, thus increasing the measurement rate.

In one embodiment, at least two transmitters each transmit time-shifted signals. These may have the same or different frequencies.

The use of closely adjacent frequencies results in a band limitation of the entire system. It has been shown that this makes it possible to take advantage of the circularly polarized signals. The reversal of the direction of rotation due to the circularly polarized signals makes it possible to isolate the required signals and/or suppress the reflections, but as such does not initially improve the precision. The interaction of the minimized propagation time differences due to the narrowband method and the reversal of the direction of rotation, on the other hand, allows a position determination with significantly improved precision.

A system for the position determination of at least one object, in particular inside a building, also serves to solve the task. This comprises at least four transmitters, each having a circularly polarized antenna, and a receiver to be localized, which has a circularly polarized antenna. At least two and in particular all transmitters are configured to transmit periodic signals of different frequencies, the frequencies of the respective transmitters being closely adjacent.

A circularly polarized antenna is an antenna capable of transmitting and/or receiving circularly polarized signals. The field of a circularly polarized antenna rotates continuously. Circularly polarized antennas are small and inexpensive and have a small bandwidth. They allow the suppression of reflected signals described above. In contrast, broadband signals would be received partially distorted and the suppression of reflected signals would be reduced.

Each of the transmitters and the receiver comprises a circularly polarized antenna. The transmitters comprise the circularly polarized antenna for transmitting circularly polarized signals. The receiver comprises the circularly polarized antenna for receiving circularly polarized signals. The circularly polarized antennas of the transmitters are configured to transmit the periodic signals of different, closely adjacent frequencies.

For example, a circularly polarized antenna may be helical or helix antennas, circularly polarized patch antennas, crossed dipoles, spiral antennas, slot antennas, dielectric resonator antennas, circularly polarized patch arrays, and/or circularly polarized slot arrays. It is also possible to use a device comprising two linearly polarized antennas offset by 90° and fed with a phase shift of 90°. The antennas of the transmitters and the receiver have the same polarization rotation direction.

Circularly polarized antennas are in particular narrowband antennas which transmit and/or receive narrowband circularly polarized signals. This results in almost constant frequency responses and a constant group propagation time in the entire band. No channel equalization is necessary.

In the case that the system is configured for position determination of an object in an indoor space, it is also referred to as an "Indoor Positioning System" or IPS.

In one embodiment, the receiver comprises means for evaluating the received signals. In particular, the receiver is configured to determine its position based on the received signals.

In one configuration, the circularly polarized antenna of at least one transmitter and/or of the receiver is arranged on a printed circuit board and/or integrated into the printed circuit board. For example, it is arranged centrally on the printed circuit board. In this case, it can be arranged in a particularly space-saving manner and produced inexpensively, in particular in comparison with a conventional patch antenna. Nevertheless, due to its flat design, it exhibits significant advantages of the patch antenna in terms of its space requirement and in terms of its simple and inexpensive producing. In particular, a circularly polarized annular-ring patch antenna is meant.

In one configuration, at least one circularly polarized antenna comprises a dielectric material, in particular a ceramic material, and an annular conductor arranged on the dielectric material. A planar conductor spaced apart from the annular conductor and arranged on the dielectric material is arranged in the radial interior of the annular conductor.

A conductor is an electrically conductive item. A conductor can be designed as a conductor track, as it is usually used on printed circuit boards. In particular, a conductor has a very small height compared to a planar extension. A conductor is typically produced from a material comprising a metal and/or an alloy. In particular, it consists of a metal or an alloy. A conductor may comprise or consist of copper and/or silver.

In particular, the annular conductor has the shape of an annular ring. It has a very small height compared to its ring width, i.e. the difference between the outer diameter and the inner diameter. For example, it has a ring width of 0.5 mm and the height is less than 0.05 mm.

The planar conductor is fan-shaped, for example, and in particular has the shape of a quarter circle. It may be arranged in the same plane as the annular conductor. Typically, it is arranged parallel to a printed circuit board on which the circularly polarized antenna is located. It can be arranged perpendicular to the central axis of the circular cylindrical dielectric material.

The dielectric material is in particular circular-cylindrical in shape and has, for example, a diameter corresponding to the outer diameter of the annular conductor. The dielectric material is in particular arranged on a printed circuit board. The annular conductor is typically arranged in a plane that is parallel to the plane of the printed circuit board. Thereby, the dielectric material defines a distance between the annular conductor and the printed circuit board.

The annular conductor and the planar conductor are arranged on the dielectric material. This means that they are arranged on a surface of the dielectric material and in particular contact the dielectric material. The dielectric material serves as electrical insulation between the annular conductor and the planar conductor and a microstrip for connecting the circularly polarized antennas. The annular conductor and the planar conductor may be exposed on the side facing away from the dielectric material, i.e. not covered by the dielectric material.

A dielectric material, also known as a dielectric, is an electrically weak or non-conductive substance in which existing charge carriers are not freely movable. An electric field, on the other hand, passes through the dielectric material. The dielectric material is a solid, typically a ceramic material. A ceramic material is inorganic, nonmetallic, poorly soluble in water, and partly crystalline, in particular at least 30% crystalline. Non-metallic means that chemical metals are not present in metallic, i.e. elemental form, but—if present—for example as oxides. In particular, ceramic materials are those which have been fired to a hard, durable item in a firing process above 700° C., wherein in particular sintering occurs during firing.

This configuration of the invention provides pure circular polarization using a small and inexpensive antenna.

In one configuration, the receiver comprises a separate receiving section for each transmitter, which is configured to receive the signals from the respective transmitter.

In other words, the receiver comprises a plurality of receiving sections for receiving signals, wherein each transmitter is associated with a receiving section of the receiver. Each receiving section is configured to receive signals of different frequencies.

A receiving section is an independent unit for receiving electromagnetic signals. The independence refers to the reception of electromagnetic signals. In contrast, the power supply or the forwarding of received and/or evaluated signals of several receiving sections may, for example, be realized by a common device in each case. Each receiving section is configured to receive signals of different frequencies, wherein at least some of the frequencies are closely adjacent. The receiver comprises at least four receiving sections.

In the following, further exemplary embodiments of the invention are also explained in more detail with reference to figures.

Figure 2:
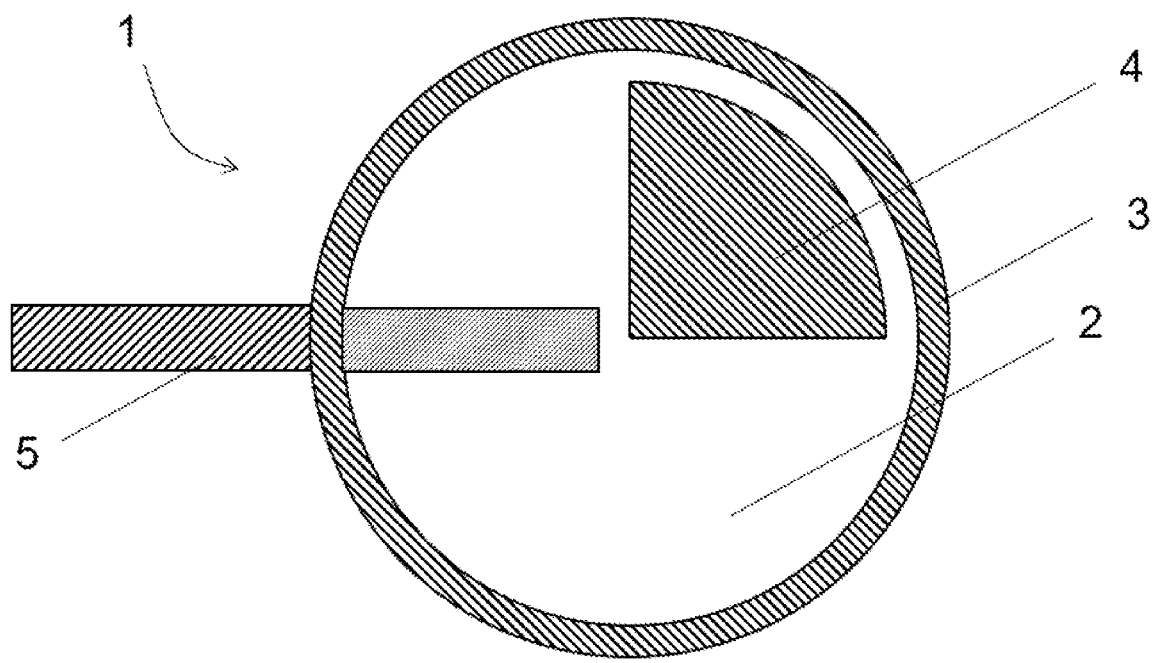
Figure 3:
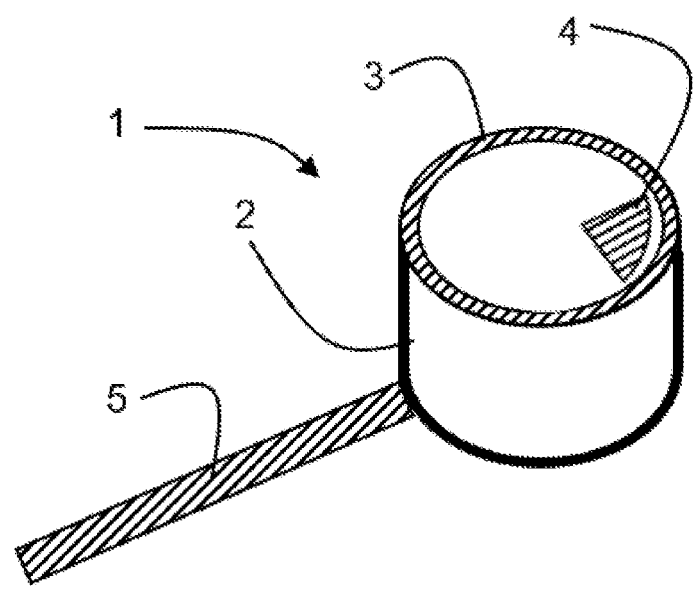

The Figures Show:

FIG. 1: a perspective view of a first exemplary embodiment of a circularly polarized antenna;

FIG. 2: a partial top view of the circularly polarized antenna of FIG. 1; and FIG. 3: a perspective view of a second exemplary embodiment of a circularly polarized antenna.

FIG. 1 shows a circularly polarized antenna 1 as part of a transmitter or receiver of a system according to the invention, which is designed for frequencies between 4 GHz and 8 GHz. This is arranged on a printed circuit board (not shown). The circularly polarized antenna 1 comprises a microstrip 5 made of copper, which is applied to the printed circuit board by means of printing and/or etching. The microstrip 5 has a width of 1 mm, a height of 35 μm and an electrical resistance of 50 ohms. The printed circuit board has a height of 0.5 mm or 0.6 mm and is produced from a hardly inflammable and flame-retardant composite material, in particular of class FR-4.

On the printed circuit board as well as on a front area of the microstrip 5 shown on the right is the dielectric material 2, which has the shape of a circular cylinder. The longitudinal axis of the circular cylinder-shaped dielectric material 2, which extends from top to bottom, is aligned perpendicular to the printed circuit board. The dielectric conductor 2 is produced from ceramic material comprising $Al_2O_3$ having a height of 2.5 mm and a diameter of 6 mm or 6.5 mm. It has a permittivity of 30.

On the upper side of the dielectric material 2, the annular conductor 3 is arranged, which consists of a copper layer with a height of 35 μm. It is annular-ring shaped, wherein the outer diameter of the annular ring corresponds to the diameter of the circular cylinder of the dielectric material 2.

The planar conductor 4 is arranged in the plane of the annular conductor 3 and in the radial interior of the annular conductor 3. It has the shape of a quarter circle and is also designed as a copper layer with a height of 35 μm. In the axial viewing direction, it is arranged in the region of the dielectric material 2 facing away from the microstrip 5 in such a way that its right-angled corner point, which would correspond to the center of the associated circle, is located on the longitudinal axis of the circular cylindrical dielectric material 2. The axial viewing direction refers to the longitudinal axis of the dielectric material and/or the annular conductor. This arrangement defines the desired polarization rotation direction of the circularly polarized antenna 1.

In another configuration, the diameter of the dielectric material 2, which is also circular cylindrical, may be 10 mm. The height of the dielectric material 2 may be 3 mm. The dielectric material 2 may have a permittivity of 10. In another configuration, the dielectric material 2 may have a height of 2.3 mm and a diameter of 6.1 mm.

FIG. 2 shows the same circularly polarized antenna in a partially cut top view with axial viewing direction. The annular conductor 3, in the radial interior of which the dielectric material 2 is visible, the planar conductor 4 and the section of the microstrip 5 outside the annular conductor 3 are shown. The section of the microstrip 5 inside the annular conductor 3, which is usually hidden by the dielectric material 2 in the uncut top view, is shown in finer hatching in this partially cut view. It can thus be seen that the microstrip 5 continues underneath the dielectric material 2, projects beyond the annular conductor 3 when viewed in the axial direction, and is extended to such an extent that the end of the microstrip 5 is at a distance of approximately 0.5 mm from the planar conductor 4.

The circular arc of the planar conductor 4 is parallel to the adjacent circular arc defined by the inner side of the annular conductor 3. In other words, the two circular arcs are parallel curves. This means that in each case two points located on a radially extending straight line, one point of which lies on the circular arc of the planar conductor 4 and the other point of which lies on the circular arc of the inside of the annular conductor 3, have the same distance. The distance measured in the radial direction between the circular arc of the planar conductor 4 and the circular arc defined by the inside of the annular conductor 3 is 0.5 mm.

FIG. 3 shows a circularly polarized antenna 1 which has the same elements as the circularly polarized antenna 1 shown in FIGS. 1 and 2. The only difference consists in the arrangement of the planar conductor 4 in the radial interior of the annular conductor 3. This is arranged in an axisymmetrically mirrored manner when viewed axially compared to its arrangement in the configuration shown in FIGS. 1 and 2. The axis along which the mirroring takes place is the longitudinal direction of extension of the microstrip 5. In this way, an opposite polarization rotation direction results.

LIST OF REFERENCE SIGNS

Circularly polarized antenna 1
Dielectric material 2
Annular conductor 3
Planar conductor 4
Microstrip 5

The invention claimed is:

1. A method for position determination of at least one object in which at least four transmitters transmit circularly polarized signals and a receiver to be localized receives the circularly polarized signals, wherein a polarization rotation direction at each transmitter and receiver is the same, wherein at least two transmitters transmit periodic signals of different frequencies, these frequencies being closely adjacent such that the closely adjacent frequencies are less than one bandwidth of the transmitted signals apart, wherein the receiver is configured to identify and disregard signals with a signal strength below a predetermined threshold value.

2. The method according to claim 1, wherein the closely adjacent frequencies are less than a reciprocal period of the transmitted signals apart.

3. The method according to claim 1, wherein the closely adjacent frequencies are less than one quarter of a reciprocal period of the transmitted signals apart.

4. The method according to claim 1, wherein at least two transmitters transmit signals in the frequency range between 3 GHz and 9 GHz.

5. The method according to claim 1, wherein at least two transmitters transmit the signals at mutually defined time intervals.

6. The method according to claim 1, wherein at least two transmitters transmit the signals simultaneously at least in time periods.

7. The method according to claim 1, wherein the closely adjacent frequencies are one eighth of a reciprocal period of the transmitted signals apart.

8. The method according to claim 1, wherein at least two transmitters transmit signals in the frequency range between 4.5 GHz and 7.5 GHz.

9. The method according to claim 1, wherein at least two transmitters transmit signals in the frequency range between 5.5 GHz and 6.5 GHz.

10. The method according to claim 1, wherein all the transmitters transmit the signals at mutually defined time intervals.

11. The method according to claim 1, wherein all the transmitters transmit the signals simultaneously at least in time periods.

12. The method of claim 1, wherein the object is positioned inside a building.

13. A system for position determination of at least one object, comprising at least four transmitters, each having a circularly polarized antenna, and a receiver to be localized, which has a circularly polarized antenna, wherein a polarization rotation direction at each transmitter and receiver is the same, wherein at least two transmitters are configured to transmit periodic signals of different frequencies, the frequencies of the respective transmitters being closely adjacent such that the closely adjacent frequencies are less than one bandwidth of the transmitted signals apart, wherein the receiver is configured to identify and disregard signals with a signal strength below a predetermined threshold value.

14. The system for position determination according to claim 13, wherein the circularly polarized antenna of at least one transmitter and/or receiver is arranged on a printed circuit board.

15. The system for position determination according to claim 13, wherein at least one circularly polarized antenna comprises a dielectric material and an annular conductor arranged on the dielectric material, wherein a planar conductor is arranged in the radial interior of the annular conductor, the planar conductor being spaced apart from the annular conductor and arranged on the dielectric material.

16. The system for position determination according to claim 15, wherein the dielectric material is a ceramic material.

17. The system for position determination according to claim 13, wherein the receiver comprises for each transmitter a separate receiving section which is configured to receive the signals of the respective transmitter.

18. The system for position determination according to claim 13, wherein all of the transmitters are configured to transmit periodic signals of different frequencies, the frequencies of the respective transmitters being closely adjacent such that the closely adjacent frequencies are less than one bandwidth of the transmitted signals apart.

19. A method for position determination of at least one object, in which at least four transmitters transmit circularly polarized signals and a receiver to be localized receives the circularly polarized signals, wherein a polarization rotation direction at each transmitter and receiver is the same, wherein all transmitters transmit periodic signals of different frequencies, these frequencies being closely adjacent such that the closely adjacent frequencies are less than one bandwidth of the transmitted signals apart, wherein the receiver is configured to identify and disregard signals with a signal strength below a predetermined threshold value.

20. The method of claim 19, wherein the object is positioned inside a building.

* * * * *